United States Patent
Noffsinger

(10) Patent No.: US 9,308,902 B1
(45) Date of Patent: Apr. 12, 2016

(54) SYSTEM AND METHOD FOR CONTROLLING A VEHICLE SYSTEM TO AVOID DESTRUCTIVE RESONANCE

(71) Applicant: GENERAL ELECTRIC COMPANY, Schenectady, NY (US)

(72) Inventor: Joseph Forrest Noffsinger, Grain Valley, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/634,914

(22) Filed: Mar. 2, 2015

(51) Int. Cl.
*G05D 1/00* (2006.01)
*B60T 7/12* (2006.01)

(52) U.S. Cl.
CPC ...................... *B60T 7/126* (2013.01)

(58) Field of Classification Search
CPC ....................................................... B60T 7/126
USPC ............................................................ 701/20
See application file for complete search history.

(56) References Cited

U.S. PATENT DOCUMENTS

| | | | | |
|---|---|---|---|---|
| 6,373,205 B1* | 4/2002 | Weimer | ............... | F16F 15/1407 123/192.1 |
| 8,374,738 B2 | 2/2013 | Noffsinger et al. | | |
| 8,446,060 B1* | 5/2013 | Lugg | ..................... | H02K 21/024 310/103 |
| 8,645,047 B2 | 2/2014 | Daum et al. | | |
| 2003/0148698 A1* | 8/2003 | Koenig | .................. | A63H 18/16 446/15 |
| 2008/0136380 A1* | 6/2008 | Hoffmann | ............. | H02P 21/005 322/29 |
| 2009/0187291 A1 | 7/2009 | Daum et al. | | |
| 2012/0277957 A1* | 11/2012 | Inoue | ..................... | B60W 30/12 701/41 |
| 2013/0131909 A1 | 5/2013 | Cooper et al. | | |
| 2014/0107876 A1 | 4/2014 | Kapp et al. | | |

\* cited by examiner

*Primary Examiner* — Ian Jen
(74) *Attorney, Agent, or Firm* — GE Global Patent Operation; John A. Kramer

(57) ABSTRACT

A system (for controlling a vehicle system along a route) includes a route geometry sensor, a speed sensor, and a controller. The route geometry sensor monitors a route curve profile for a segment of the route. The speed sensor monitors a speed of the vehicle system. The controller identifies a characteristic frequency associated with the vehicle system. The controller determines a periodic driving force exerted on the vehicle system from the route based on the route curve profile and the speed of the vehicle system. The controller analyzes the periodic driving force with the characteristic frequency to determine an excitation rate. Responsive to the excitation rate exceeding a designated threshold, the controller designates tractive efforts or braking efforts for implementation by the vehicle system to change the speed of the vehicle system such that the excitation rate falls below the threshold.

21 Claims, 2 Drawing Sheets

SYSTEM AND METHOD FOR CONTROLLING A VEHICLE SYSTEM TO AVOID DESTRUCTIVE RESONANCE

FIELD

Embodiments of the subject matter described herein relate to a method and system for controlling a vehicle system traveling on a route.

BACKGROUND

Resonance is the tendency of a system to oscillate with greater amplitude at some frequencies as compared to other frequencies. The frequencies that produce maximum or larger increases in amplitude than other frequencies can be referred to as resonant frequencies or resonance frequencies. Even a small periodic driving force at a resonant frequency can result in large amplitude oscillations by the system. Different systems have different resonant frequencies, depending on material compositions, sizes, and shapes of the systems.

Vehicle systems, like other systems, have resonant frequencies. As a vehicle system travels, driving forces may cause the vehicle system to oscillate up and down and/or side to side at a resonant frequency associated with a suspension system of the vehicle system. The periodic driving forces that stimulate the oscillations may be, for example, vibrations from a motor on the vehicle system or normal forces exerted by bumps, hills, or other curves in the route. If the vehicle system travels at a certain speed, the periodic driving forces may excite the vehicle system at the resonant frequency, producing large amplitude oscillations of the vehicle system as the vehicle system travels, which may be destructive.

In a rail vehicle context, oscillations of the rail vehicle at a destructive resonance condition may damage and/or derail the rail vehicle. For example, the oscillations may bend and/or buckle structural components of the rail vehicle. The rail vehicle may oscillate with such force that the rail vehicle essentially "hops" off of the rail. Due to the nature of resonance, the track curves that drive such destructive oscillations may be fully compliant with regulations and standards, such that the slopes, curves, and undulations of the track are not in violation of such regulations and standards. Thus, the destruction caused by resonance is not necessarily mitigated by bringing sections of track into compliance with existing regulations and standards.

BRIEF DESCRIPTION

In one embodiment, a system (e.g., a control system for controlling a vehicle system that travels on a route) includes a route geometry sensor, a speed sensor, and a controller. The route geometry sensor is configured to monitor a route curve profile for a segment of the route as the vehicle system traverses the segment of the route. The speed sensor is configured to monitor a speed of the vehicle system traversing the segment of the route. The controller includes one or more processors. The controller is configured to identify a characteristic frequency associated with the vehicle system. The controller is configured to receive the route curve profile from the route geometry sensor and a speed parameter associated with the speed from the speed sensor. The controller is further configured to determine a periodic driving force exerted on the vehicle system from the route along the segment of the route based on the route curve profile and the speed parameter. The controller is configured to analyze the periodic driving force with the characteristic frequency to determine an excitation rate for the vehicle system. Responsive to the excitation rate exceeding a designated threshold, the controller is configured to designate (e.g., in a mitigation plan that the controller is configured to generate) at least one of one or more tractive efforts or one or more braking efforts for implementation by the vehicle system to change the speed at which the vehicle system travels along the segment of the route such that the excitation rate falls below the threshold.

In another embodiment, a method (e.g., for controlling a vehicle system that travels along a route) includes identifying a characteristic frequency associated with the vehicle system. The method includes monitoring a route curve profile for a segment of the route. The method also includes determining a periodic driving force for the segment of the route. The periodic driving force includes a series of forces attributable to undulations in the route that are exerted on the vehicle system over time. The periodic driving force is determined based on the route curve profile and a first speed at which the vehicle system traverses the segment of the route. The method further includes determining a first excitation rate for the vehicle system along the segment of the route at the first speed by analyzing the periodic driving force with the characteristic frequency. Responsive to the first excitation rate exceeding a designated threshold, the method includes designating at least one of one or more tractive efforts or one or more braking efforts for implementation by the vehicle system such that the vehicle system traverses the segment at a different, second speed. The second speed produces a second excitation rate that is below the threshold.

In another embodiment, a system (e.g., a control system for controlling a vehicle system that travels along a route) includes a memory and a controller. The memory stores a route curve profile for a segment of the route. The controller is communicatively coupled to the memory. The controller includes one or more processors. The controller is configured to identify a characteristic frequency associated with the vehicle system. The controller is further configured to access the route curve profile from the memory and use the route curve profile and the characteristic frequency to determine multiple excitation rates for the vehicle system for a range of prospective speeds at which the vehicle system traverses the segment of the route. Each of the excitation rates corresponds to a different speed in the range of prospective speeds. The controller is configured to compare the multiple excitation rates to a designated threshold and identify a subset of acceptable speeds within the range of prospective speeds. The acceptable speeds are each associated with an excitation rate that is below the designated threshold. The controller is further configured to designate at least one of tractive efforts or braking efforts for implementation by the vehicle system such that the vehicle system achieves one or more of the acceptable speeds as the vehicle system traverses the segment of the route.

In another embodiment, a control system (e.g., a control system for controlling a vehicle system) includes a route geometry sensor, a speed sensor, and a controller. The route geometry sensor is configured to monitor a route curve profile for a segment of a route as the vehicle system traverses the segment of the route. The speed sensor is configured to monitor a speed of the vehicle system traversing the segment of the route. The controller includes one or more processors, and is configured to determine a periodic driving force exerted on the vehicle system from the route along the segment of the route based on the route curve profile and information of the speed. The controller is further configured to determine an excitation rate for the vehicle system based on the periodic driving force and a characteristic frequency associated with the vehicle system. Responsive to the excitation rate exceeding a designated threshold, the controller is configured to designate at least one of one or more tractive efforts or one or more braking efforts for implementation by the vehicle system to change the speed at which the vehicle system travels along the segment of the route such that the excitation rate falls below the threshold.

DETAILED DESCRIPTION

Figure 1:
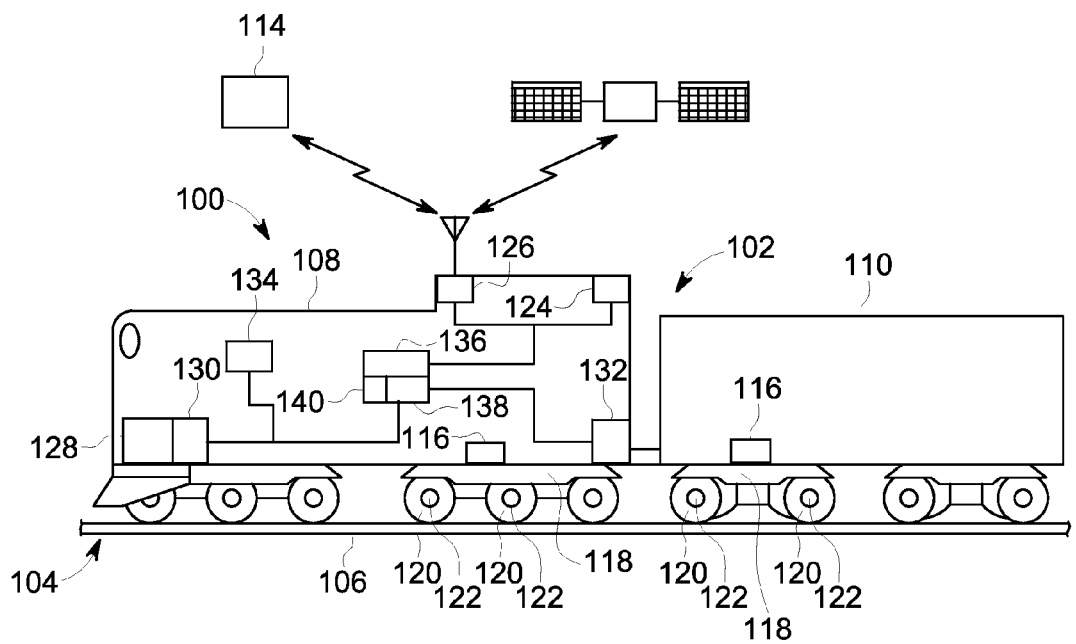
FIG. 1 is a schematic diagram of one embodiment of a control system disposed onboard a vehicle system.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "module," "system," "device," or "unit," may include a hardware and/or software system and circuitry that operate to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, or units can include or represent hardware circuits or circuitry that include and/or are connected with one or more processors, such as one or computer microprocessors.

Embodiments of the subject matter disclosed herein describe methods and systems used in conjunction with a vehicle system traveling on a route. The embodiments provide methods and systems for controlling the vehicle system as the vehicle system travels along the route such that the vehicle system avoids experiencing a destructive resonant condition.

At certain speeds, periodic impulses on the vehicle system may cause the vehicle system to oscillate at a resonant frequency. The periodic impulses are referred to as driving forces, and may be attributable to vibration, route curvature, periodic gaps, bumps, or depressions in the route, or the like. The speed of the vehicle system affects the frequency of the periodic impulses or driving forces on the vehicle system. The relationship between the frequency of the driving forces and the resonant frequency of the vehicle system affects how the vehicle system reacts to the periodic driving forces. For example, if the frequency of the periodic driving forces is at or close to a resonant frequency of the vehicle system, the vehicle system absorbs energy from the forces which causes the vehicle system to oscillate at an increased intensity, or amplitude. As the periodic driving force continues at that frequency or a similar frequency, the intensity of the oscillations continues to increase, potentially leading to a destructive resonance condition if not remedied. In a destructive resonant condition, the up and down or side to side oscillations of the vehicle system may damage the vehicle system and/or the surrounding environment. For example, the oscillations may cause the vehicle system to buckle and/or bend under the stress, damaging structural components of the vehicle system. In addition, the oscillations may cause the vehicle system to tip over or "jump" off of the route or track on which the vehicle system travels.

In one embodiment, the control system analyzes route curve profiles and speed parameters with an identified characteristic frequency of the vehicle system to determine how energy from the route is absorbed by the vehicle system. For example, the route curve profile of the route and the speed of the vehicle system may cause a periodic driving force at a frequency that stimulates the vehicle system to oscillate at the characteristic frequency of the vehicle system. The characteristic frequency may be a resonant frequency associated with the vehicle system. If the control system determines that the route curve profile and speed of the vehicle system excites or stimulates oscillations of the vehicle system to an extent that could lead to a destructive resonant condition, the control system is configured to generate a mitigation plan. The mitigation plan is configured to control the movement of the vehicle system to modify the excitation impulses exerted on the vehicle system, such as the frequency or intensity of the impulses, such that the impulses do not lead to a destructive resonant condition. The mitigation plan may designate tractive efforts and braking efforts that cause the vehicle system to travel at a different speed in order to reduce or dampen the oscillations of the vehicle system.

In another embodiment, the control system monitors a route curve profile for a segment of track and identifies a characteristic frequency of a vehicle system. The control system analyzes the route curve profile with the characteristic frequency at a range of prospective speeds of the vehicle system over the segment of the route to determine a subset of acceptable speeds in the range of prospective speeds that will not produce, or at least are unlikely to produce, a destructive resonant condition. The control system may then designate tractive efforts and braking efforts for the vehicle system such that the vehicle system travels along the segment of the route at one or more of the acceptable speeds.

At least one technical effect of the various embodiments may include decreased likelihood of damage and destruction resulting from the vehicle system oscillating at a destructive resonant condition as the vehicle system travels along a route. Another technical effect may include an increased availability of information regarding track curvature, which can result in earlier recognition of track portions that require maintenance. A further technical effect may include determining with more precision specific speeds for a given vehicle system that should be avoided during a trip over a specific segment of a route. The more precise information may allow for enhanced control and performance of the vehicle system. For example, for an undulating segment of the route that is known to drive oscillations of vehicle systems, instead of applying a broad speed restriction (for example, setting a speed limit of 25 miles per hour (mph) to avoid a broad range of potential resonance-inducing speeds), the control system may analyze the undulations in the segment with an identified characteristic frequency specific to the vehicle system to determine a narrow range of speeds that should be avoided by the that vehicle system. For example, the control system may determine that only speeds of 39-41 mph risk triggering destructive resonant oscillations, so the vehicle system may be controlled to run at speeds up to 37 mph and/or above 43 mph, for example, over the segment of the route. The increase in the range of allowable or acceptable speeds through the identified segment of route allows for increased efficiency and shorter travel times, among other benefits. Thus, the control system provides a reduced likelihood of damage caused by a destructive resonance condition and also provides increased flexibility in controlling the movements of the vehicle system.

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not therefore to be considered to be limiting of its scope. Wherever possible, the same reference numerals used throughout the drawings refer to the same or like parts. To the extent that the figures illustrate diagrams of the functional blocks of various embodiments, the functional blocks are not necessarily indicative of the division between hardware and circuitry. Thus, for example, components represented by multiple functional blocks (for example, processors, controllers, or memories) may be implemented in a single piece of hardware (for example, a general purpose signal processor, microcontroller, random access memory, hard disk, or the like). Similarly, any programs and devices may be standalone programs and devices, may be incorporated as subroutines in an operating system, may be functions in an installed software package, or the like. The various embodiments are not limited to the arrangements and instrumentality shown in the drawings.

FIG. 1 illustrates a schematic diagram of a control system 100 according to an embodiment. The control system 100 is disposed on a vehicle system 102. The vehicle system 102 is configured to travel on a route 104. The vehicle system 102 is configured to travel along the route 104 on a trip from a starting or departure location to a destination or arrival location. The vehicle system 102 includes a propulsion-generating vehicle 108 and a non-propulsion-generating vehicle 110 that are mechanically interconnected to one another in order to travel together along the route 104. Alternatively, the vehicle system 102 may be formed from a single vehicle 108.

The propulsion-generating vehicle 108 is configured to generate tractive efforts to propel (for example, pull or push) the at least one non-propulsion-generating vehicle 110 along the route 104. The propulsion-generating vehicle 108 includes a propulsion subsystem, including one or more traction motors, that generates tractive effort for the vehicle system 102 to propel itself. The propulsion-generating vehicle 108 also includes a braking subsystem that generates braking effort for the vehicle system 102 to slow down or stop itself from moving. Optionally, the non-propulsion-generating vehicle 110 includes a braking subsystem but not a propulsion subsystem. The propulsion-generating vehicle 108 is referred to herein as a propulsion vehicle 108, and the non-propulsion-generating vehicle 110 is referred to herein as a car 110. Although one propulsion vehicle 108 and one car 110 are shown in FIG. 1, the vehicle system 102 may include multiple propulsion vehicles 108 and/or multiple cars 110. In an alternative embodiment, the vehicle system 102 only includes the propulsion vehicle 108 such that the propulsion vehicle 108 is not coupled to a car 110 or another kind of vehicle.

The control system 100 is used to control the movements of the vehicle system 102. In the illustrated embodiment, the control system 100 is disposed entirely on the propulsion vehicle 108. In other embodiments, however, one or more components of the control system 100 may be distributed among several vehicles, such as by being disposed on each of the vehicles 108, 110 that make up the vehicle system 102. For example, some components may be distributed among two or more propulsion vehicles 108 that are coupled together in a group or consist. In an alternative embodiment, at least some of the components of the control system 100 may be located remotely from the vehicle system 102, such as at a dispatch location 114, and the remote components of the control system 100 are communicated to the vehicle system 102 (and components of the control system 100 disposed on the vehicle system 102).

In the illustrated embodiment, the vehicle system 102 is a rail vehicle system, and the route 104 is a track 104 formed by one or more rails 106. The propulsion vehicle 108 may be a locomotive, and the car 110 may be a rail car that carries passengers and/or cargo. Alternatively, the propulsion vehicle 108 may be another type of rail vehicle other than a locomotive. In an alternative embodiment, the vehicle system 102 may be a non-rail vehicle system, such as an off-highway vehicle (OHV) system (e.g., a vehicle system that is not legally permitted and/or designed for travel on public roadways), an automobile, or the like.

While some examples provided herein describe the route 104 as being a track 104, not all embodiments are limited to a rail vehicle traveling on a railroad track. One or more embodiments may be used in connection with non-rail vehicles and routes other than tracks, such as roads, waterways, or the like.

As the vehicle system 102 travels on the track 104 along the route during a trip, the control system 100 may be configured to measure, record, or otherwise receive and collect input information about the track 104, the vehicle system 102, and the movement of the vehicle system 102 on the track 104. For example, the control system 100 may be configured to monitor track geometry of the track 104 and a speed at which the vehicle system 102 moves along the track 104. In addition, the control system 100 may be configured to analyze the information received and generate a trip plan and/or a control signal based on such information. The trip plan and/or control signal designates operating parameters or orders for the vehicle system 102 to follow or execute during the trip. The parameters may include tractive and braking efforts for the vehicle system 102 expressed as a function of time and/or location along the route or distance relative to a fixed parameter, such as the starting location, the arrival location, or a wayside device (located along the route near the track 104).

In an embodiment, the trip plan generated by the vehicle system 102 may be a mitigation plan that includes edits or updates to a previously-generated trip plan (which may or may not have been generated by the control system 100 earlier). For example, the previously-generated trip plan could be received from a remote location or retrieved from an electronic storage device, and the control system 100 generates a mitigation plan to deviate from the previously-generated trip plan. The control system 100 may generate a mitigation plan when needed based on received input data from components of the control system 100 and/or the vehicle system 102 that is outside of an expected or allowable range or condition.

The trip plan (including the mitigation plan) is configured to increase or maximize desired goals or parameters during the trip of the vehicle system 102, such as energy efficiency and speed, and reduce or minimize other parameters, such as wheel and rail wear, fuel usage, noise, and emissions, while meeting or abiding by constraints and limitations, such as speed limits, schedules, regulations, standards, and the like. For example, the trip plan may reduce energy consumption during the trip while abiding by safety and regulatory restrictions. The energy consumed (e.g., in terms of current, fuel, or the like) may be reduced relative to travel along the same trip in the same time period but not according to the trip plan. In an embodiment, the trip plan may be configured to increase efficiency and speed of the vehicle system 102 along the route while avoiding certain speeds that could lead to a destructive resonant condition of the vehicle system 102, which could damage the vehicle system 102 and produce an unsafe situation. The trip plan may be established using an algorithm based on models for vehicle behavior for the vehicle system 102 along the route. The algorithm may include a series of non-linear differential equations derived from applicable physics equations with simplifying assumptions, such as described in connection with U.S. patent application Ser. No. 12/955,710, U.S. Pat. No. 8,655,516, entitled "Communication System for a Rail Vehicle Consist and Method for Communicating with a Rail Vehicle Consist," which was filed 29 Nov. 2010 (the "'516 Patent"), the entire disclosure of which is incorporated herein by reference. In one aspect, a trip plan (including a mitigation plan) can designate operational settings of the vehicle system as a function of time and/or distance along the route. For example, the trip plan can dictate speeds, throttle settings, brake settings, accelerations, or the like, of the vehicle system as a function of time and/or distance along the route being traveled upon for an upcoming portion or remainder of the trip.

The control system 100 may be configured to control the vehicle system 102 along the trip based on the trip plan (including the mitigation plan), such that the vehicle system 102 travels according to the trip plan. Depending on an operational setting or configuration of the control system 100, the vehicle system 102 may automatically control or implement a throttle and brake of the vehicle system 102 consistent with the trip plan, or the vehicle system 102 may suggest control settings for the throttle and brake of the vehicle system 102 to an operator of the vehicle system 102 (for the operator to manually implement). As an example, the control system 100 may be or include a Trip Optimizer™ system from General Electric Company, or another energy management system. For additional discussion regarding a trip plan, see the '516 Patent.

The vehicle system 102 includes multiple trucks or bogies 118. The trucks 118 include multiple wheels 120 that engage the track 104 and at least one axle 122 that couples left and right wheels 120 together (only the left wheels are shown in FIG. 1). Optionally, the trucks 118 may be fixed-axle trucks, such that the wheels 120 are rotationally fixed to the axles 122, so the left wheel rotates the same speed, amount, and at the same times as the right wheel. Each truck 118 also includes a suspension system that mechanically couples a body or structure of the corresponding vehicle 108, 110 to the wheels 120. The suspension systems are configured to dampen forces from the track 104 to reduce the forces experienced by the bodies of the vehicles 108, 110. The suspension systems may include springs to absorb impact forces and shock absorbers to control spring motions. The type of trucks 118 on the propulsion vehicle 108 may be different than the type of trucks 118 on the car 110. For example, the trucks 118 on the propulsion vehicle 108 may have more wheels 120 and a different suspension system than the trucks 118 on the car 110. Due to the different types of trucks 118, including different suspension systems, the propulsion vehicle 108 may have different resonant frequencies than the car 110. The resonant frequencies are frequencies at which the vehicles 108, 110 are prone to oscillate or vibrate. The resonant frequencies are natural or inherent to the corresponding vehicles 108, 110, and are determined by materials, sizes, and shapes of the vehicles 108, 110.

The vehicle system 102 has a characteristic frequency that is associated with the vehicle system 102. Each characteristic frequency is a frequency at which the vehicle system 102 oscillates, vibrates, resonates, reverberates, and/or the like. For example, as the vehicle system 102 travels along the route, periodic impulses or driving forces on the vehicle system 102 may cause the vehicle system 102 to oscillate, vibrate, resonate, and/or reverberate at the characteristic frequency. The periodic driving forces include a series of forces exerted on the vehicle system 102 from the track 104 over time as the vehicle system 102 traverses a segment of the route. As used herein, the segment of the route may be the entire section of the route between the starting and destination locations of the trip, or a portion of such section of the route traversed during the trip. The series of forces may be attributable to vibrations (such as from propulsion motors or braking efforts) and/or changes in track geometry (such as vertical curves, horizontal curves, and or undulations in super-elevation of the track 104).

In an embodiment, the characteristic frequency of the vehicle system 102 is a resonant frequency of at least one of the vehicles 108, 110 in the vehicle system 102. For example, each of the different types of vehicles 108, 110 in the vehicle system 102 may have a different resonant frequency at which the corresponding vehicles 108, 110 are predisposed to oscillate. The vehicle system 102 may have multiple characteristic frequencies at which the vehicle system 102 oscillates due to the different types of vehicles 108, 110 in the vehicle system 102. For example, the vehicle system 102 may have a first characteristic frequency that is the resonant frequency of the one or more propulsion vehicles 108 and may also have a second characteristic frequency that is the resonant frequency of the one or more cars 110.

In some of the embodiments described herein, the vehicle system 102 is referred to as being associated with a single characteristic frequency, although it is recognized that the single characteristic frequency may be one of multiple characteristic frequencies associated with the vehicle system 102. For example, the procedures and processes performed by the control system 100 that are described below with reference to a single characteristic frequency associated with the vehicle system 102 may additionally be performed with one or more other characteristic frequencies of the vehicle system 102. For example, the control system 100 is configured to control the speed of the vehicle system 102 along a segment of the route such that oscillations of the vehicle system 102 at the characteristic frequency do not produce a destructive resonant condition. Optionally, the control system 100 may control the speed of the vehicle system 102 along the segment of the route with reference to multiple characteristic frequencies of the vehicle system 102 such that, for example, the speed at which the vehicle system 102 travels does not trigger a destructive resonant condition of the one or more propulsion vehicles 108 or a destructive resonant condition of the one or more cars 110.

The vehicle system 102 may include plural interconnected cars 110 that are a common type of vehicle, such as open hopper, covered hopper, flatcar, gondola, passenger, boxcar, or the like. The plural interconnected cars 110 may have a common type of suspension system that is common to all or at least some of the cars 110. The number of cars 110 may greatly outnumber the number of propulsion vehicles 108. The vehicle system 102 may have fifty or one hundred such cars 110, for example, and less than five propulsion vehicles 108. The vehicle system 102 may be a unit train, and the cars 110 may be a series of coal cars or the like. Thus, due to the significant difference in numbers, the characteristic frequency associated with the vehicle system 102 may be the resonant frequencies of the cars 110 in the vehicle system 102. The resonant frequencies of the cars 110 may be associated with the resonant frequencies of the suspension system of the cars 110. As the vehicle system 102 travels along a segment of the route during a trip, periodic driving forces may cause the string of cars 110 to all oscillate at one of the resonant frequencies of the cars 110. If enough energy from the periodic driving forces is absorbed by the cars 110 of the vehicle system 102, the amplitude or intensity of the oscillations may reach a destructive resonant condition, which could damage and/or tip over multiple cars 110 of the vehicle system 102.

In an alternative embodiment, the vehicle system 102 includes only one or more propulsion vehicles 108 (and no cars 110) or at least a greater number of propulsion vehicles 108 than cars 110, and the characteristic frequency associated with the vehicle system 102 is one of the resonant frequencies of the propulsion vehicles 108 (instead of being one of the resonant frequencies of the cars 110). For example, the resonant frequency of the propulsion vehicles 108 may be a resonant frequency of the suspension systems of the trucks 118 on the propulsion vehicles 108.

The control system 100 includes at least one speed sensor 116 disposed on the vehicle system 102. In the illustrated embodiment, multiple speed sensors 116 are located on or near the trucks 118. The at least one speed sensor 116 is configured to monitor a speed of the vehicle system 102 as the vehicle system 102 traverses the route. The speed sensor 116 may be a speedometer, a vehicle speed sensor (VSS), or the like. The speed sensor 116 may provide a speed parameter associated with a current speed of the vehicle system 102. The speed parameter may be communicated to a controller in the control system 100 periodically, such as automatically once every second or every two seconds or, alternatively, upon receiving a request for the speed parameter.

The control system 100 may further include a locator device 124 that is configured to determine a location of the vehicle system 102 on the route. The locator device 124 may be a global positioning system (GPS) receiver. The locator device 124 may be used to determine the proximity of the vehicle system 102 along a trip from one or more known sections of repeating or undulating curves in the track 104. The control system 102 may further include a wireless communication system 126 that allows wireless communications between vehicles 108, 110 in the vehicle system 102 and/or with remote locations, such as the remote (dispatch) location 114. The communication system 126 may include a receiver and a transmitter, or a transceiver that performs both receiving and transmitting functions. The communication system 126 may include an antenna.

The control system 100 includes a route geometry sensor 128. The route geometry sensor 128 is configured to monitor a route curve profile for a segment of the route as the vehicle system 102 traverses the segment of the route. The route geometry sensor 128 may be one or more of an accelerometer, a gyroscope, an angular position sensor, an inertial navigation reference device, or the like. For example, the route geometry sensor 128 may be a system of multiple discrete sensors or devices that are used together to monitor the route curve profile. The route curve profile describes a three-dimensional geometry of the track 104 along a corresponding segment of the route. The geometry includes elevation, grade, vertical curvature, horizontal curvature, and cant (or super-elevation) of the track 104 as a function of location along the segment. The route curve profile may include detailed information about the curvatures of the track 104, such as locations of the curves, lengths of the curves, degrees of the curves, and super-elevation along the curves.

In an embodiment, the route geometry sensor 128 measures the route curve profile of the segment of the track 104 as the vehicle system 102 traverses the segment during a trip. Thus, the route geometry sensor 128 measures the three-dimensional geometry of the track 104 during the trip to monitor the route curve profile for the corresponding segment of the route. The route curve profile (for example, the data regarding the three-dimensional geometry of the track 104) may be recorded and/or stored in a track characterization memory 130 or database in real-time as the vehicle system 102 traverses the segment of the track 104. The track characterization memory 130 is a computer-readable electronic storage device or medium that records the data received from the route geometry sensor 128. Optionally, the track characterization memory 130 may store one or more route curve profiles that were monitored and/or measured during previous trips of the vehicle system 102, trips of another vehicle system, or that were obtained from another database or memory structure.

The control system 100 may also include a vehicle characterization element 134 that provides information about the vehicle system 102 make-up, such as the type of cars 110 (for example, the manufacturer, the product number, the materials, etc.), the number of cars 110, the weight of cars 110, whether the cars 110 are consistent, meaning relatively identical in weight and distribution throughout the length of the vehicle system 102, or inconsistent, the type of cargo, the weight of vehicle system 102, the number of propulsion vehicles 108, the position and arrangement of propulsion vehicles 108 relative to the cars 110, the type of propulsion vehicles 108 (including power output capabilities and fuel usage rates), and the like. The vehicle characterization element 134 may also include information about the suspension systems of the cars 110 and propulsion vehicles 108, such as known resonant frequencies of the cars 110 and the propulsion vehicles 108. The vehicle characterization element 134 may be a database in an electronic storage device, or memory. The information in the vehicle characterization element 134 may be input using an input/output (I/O) device by an operator, may be automatically uploaded, or may be received via the communication system 126. The source or at least some of the information in the vehicle characterization element 134 may be a vehicle manifest, a log, or the like.

The control system 100 also includes additional sensors 132 that measure other operating parameters of the vehicle system 102 during the trip besides speed, for example, which is measured by the speed sensor 116. The additional sensors 132 may include a pressure sensor used to detect a pressure of air in an air brake of the braking subsystem, such as to determine if the pressure in the air brake is high enough to stop the vehicle system 102 if so desired by the operator. In another example, the additional sensors 132 may include throttle and brake position sensors that monitor the positions of manually-operated throttle and brake controls and communicate control signals to the respective propulsion and braking subsystems. Furthermore, the sensors 132 may include sensors that monitor current output by the motors of the propulsion subsystem and the brakes of the braking subsystem to determine the current tractive and braking efforts of the vehicle system 102.

The above is merely a short list that represents some sensors that may be on the vehicle system 102 and used by the control system 100.

The control system 100 has a controller 136 or control unit that is a hardware and/or software system that operates to perform one or more functions. The controller 136 receives information from other components of the control system 100, analyzes the received information, and generates control signals to control operations of the control system 100 and/or the movements of the vehicle system 102. The controller 136 has access to, or receives information from, the speed sensor 116, the route geometry sensor 128, the track characterization memory 130, the vehicle characterization element 134, and at least some of the other sensors 132 on the vehicle system 102. The controller 136 may be a device that includes a housing. The controller 136 includes one or more processors 138 therein (for example, within a housing of the controller 136). Each processor 138 can include a microprocessor or equivalent control circuitry. At least one algorithm operates within the one or more processors 138. For example, the one or more processors 138 may operate according to one or more algorithms to generate a trip plan, as described above.

The controller 136 optionally may also include a controller memory 140, which is an electronic, computer-readable storage device or medium. The controller memory 140 may be housed in the housing of the controller 136, or alternatively may be on a separate device that is communicatively coupled to the controller 136 and the one or more processors 138 therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory 140 can include a tangible, non-transitory computer-readable storage medium that stores data on a temporary or permanent basis for use by the one or more processors 138. The memory 524 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

In an embodiment, the controller 136 is configured to identify a characteristic frequency associated with the vehicle system 102. The controller 136 is also configured to receive the route curve profile from the route geometry sensor 128 and a speed parameter associated with the speed of the vehicle system 102 from the speed sensor 116 as the vehicle system 102 traverses a segment of the route. The controller 136 is further configured to determine a periodic driving force exerted on the vehicle system 102 from the track 104 along the segment of the route based on the route curve profile and the speed parameter. The controller 136 is configured to analyze the periodic driving force with the identified characteristic frequency to determine an excitation rate for the vehicle system 102. Optionally, if the excitation rate exceeds a designated threshold, the controller 136 may generate a mitigation plan that designates tractive and/or braking efforts for implementation by the vehicle system 102. The implemented tractive and/or braking efforts causing the vehicle system 102 to change the speed at which the vehicle system 102 travels along the segment of the route such that the excitation rate is below the threshold. An excitation rate above the threshold may lead to a destructive resonant condition of the vehicle system 102, in which high energy oscillations of at least part of the vehicle system 102 could damage or even tip over the vehicle system 102. These functions of the controller 136 are described in more detail with reference to FIG. 2 below.

Figure 2:
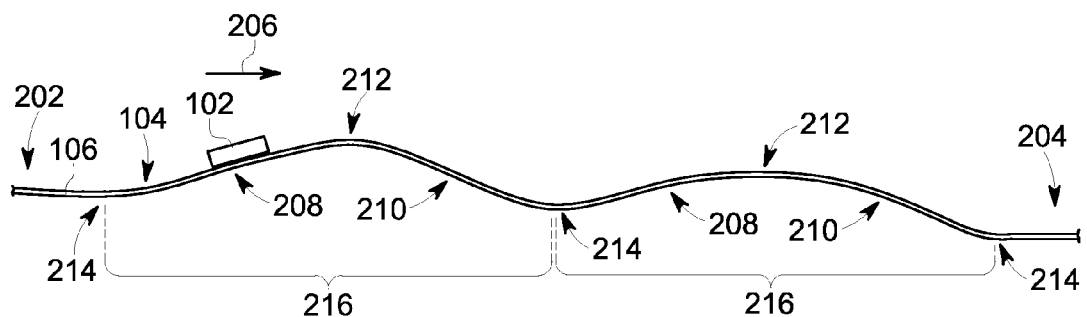
FIG. 2 is a schematic diagram showing a side profile view of the vehicle system traveling on an undulating segment of a route.

FIG. 2 is a schematic diagram showing a side profile view of the vehicle system 102 traveling on an undulating segment of track 104 along a route. The segment of the track 104 has multiple vertical curves that undulate for the length of the segment. The vehicle system 102 travels across the segment from a starting location 202 to an ending location 204 of the segment in a forward direction 206. The segment has two upward sloping sections 208 (referred to as uphill sections 208) and two downward sloping sections 210 (referred to as downhill sections 210). The uphill and downhill sections 208, 210 alternate such that the track 104 undulates similar to a wave. The uphill sections 208 and downhill sections 210 may be attributable to the grade of the earth below the track 104. For example, the first uphill and downhill sections 208, 210 of the track 104 encountered by the vehicle system 102 may be on a first hill, and the second uphill and downhill sections 208, 210 may be on a second hill. The low area between the first and second hills may be a valley. The uphill and downhill sections 208, 210 are shown for illustration, and may have exaggerated angles of curvature for illustrative purposes. The length of each of the sections 208, 210 may be up to or greater than a mile.

As the vehicle system 102 travels in the forward direction 206 over the segment of the route illustrated in FIG. 2, the vehicle system 102 experiences a periodic driving force that is exerted on the vehicle system 102 from the track 104. The periodic driving force may be attributable to a normal force exerted on the vehicle system 102 which slightly changes the trajectory of the vehicle system 102. For example, in FIG. 2, both of the uphill sections 208 of the track 104 exert a normal force on the vehicle system 102 as the vehicle system 102 enters the respective uphill sections 208, changing the trajectory of the vehicle system 102 from a downward or neutral trajectory to an upward trajectory that leads to an apex 212 at the end of each uphill section 208. The forces exerted on the vehicle system 102 by the vertical curves of the uphill sections 208 of the track 104 may be a periodic driving force because, as the vehicle system 102 traverse the segment of the route, the vehicle system 102 experiences the force from the first uphill section 208 and then later experiences the force from the second uphill section 208, such that the forces are periodical. The forces are directed generally upwards, which may cause the vehicle system 102 to oscillate up and down as the vehicle system 102 travels in the forward direction 206. The period between the driving forces depends on the characteristics of the track 104, such as the distance between the uphill sections 208 that provide the forces, and on the speed of the vehicle system 102 as the vehicle system 102 traverses the segment of the route.

The undulations in the track 104 may alternatively be caused by other than hills and valleys in the topography. For example, the undulations may be caused by a series of depressions and/or bumps (for example, juts or protuberances) in the track 104 attributable to joints in the track 104 or the way that the track 104 settles or wears after repeated use of the track 104. In the description below, it is assumed that the variations in curvature along the segment of the route, such as the type, number, and severity (for example, degree of curvature) of upward sloping sections 208 and downward sloping sections 210 in the track 104 are fully compliant with all applicable track regulations.

In FIG. 2, the track 104 undulates in the vertical direction, and the undulations exert a periodic driving force on the vehicle system 102 as the vehicle system 102 traverses the segment of the route. Other characteristics of the track 104 may also or alternatively exert periodic driving forces on the vehicle system 102. For example, the track 104 may have horizontal curves that undulate horizontally due to a winding path of the segment of the route. As the track 104 changes directions along a horizontal curve, the track 104 (for example, the rails 106 in a rail vehicle context) provides a normal force on the vehicle system 102 to change the trajectory of the vehicle system 102. Since the curves are horizontal, the forces are directed side-to-side instead of up and down, so the vehicle system 102 may oscillate side-to-side (for example, left and right) as the vehicle system 102 travels in the forward direction 206.

In another example, the track 104 may undulate in both horizontal and vertical planes due to variations in super-elevation or cant of the track 104, which is the difference in elevation between two edges or sides. Along the segment of the route, a left side of the track 104 may be higher in elevation than a right side of the track 104 for a first length, and the left side may be lower in elevation than the right side for a subsequent second length. The changes in super-elevation may be due to depressions located at joints in the track 104 (for example, joints between portions of rails 106) as the track 104 settles. Thus, as the vehicle system 102 traverses the first length, the super-elevation causes the vehicle system 102 to lean to the right side, and as the vehicle system 102 traverses the second length the vehicle system 102 leans to the left side. Such variations or undulations in the super-elevation of the track 104 may exert periodic driving forces on the vehicle system 102 similarly to the normal forces exerted by the vertical curves of the track 104, shown in FIG. 2. Undulations in the super-elevation of the track 104 force the vehicle system 102 in both the vertical and horizontal planes, such that the vehicle system 102 oscillates both left-to-right and up-and-down as the vehicle system 102 travels in the forward direction 206.

The periodic driving forces cause the vehicle system 102 to oscillate at the characteristic frequency associated with the vehicle system 102. But, the intensity of the oscillations depends on how the forces are absorbed by the vehicle system 102. The periodic driving forces may be absorbed by the vehicle system 102 at different rates or extents based on the characteristics of the driving forces, such as the magnitude and timing of the forces on the vehicle system 102. For example, some periodic driving forces are exerted on the vehicle system 102 at times or frequencies that complement the characteristic frequency of the vehicle system 102. Such complementary driving forces are readily absorbed by the vehicle system 102 and contribute to an increase in the amplitude or energy of the oscillations. Complementary driving forces are compatible or harmonious with the frequency of oscillations of the vehicle system 102, and propel the vehicle system 102 to oscillate at an intensity that increases over time. Even if the magnitude of the driving forces is not significant, the timing of the forces and the repetition of the forces may increase the severity of the oscillations over time, potentially leading to a destructive resonant condition.

On the other hand, periodic driving forces exerted on the vehicle system 102 at times or frequencies that are non-complementary with the characteristic frequency are not readily absorbed by the vehicle system 102, and do not contribute to an increase in the amplitude or energy of the oscillations, even if the magnitude of the force is significant. For example, non-complementary forces may actually result in a dampening effect that reduces the intensity of oscillations of the vehicle system 102. Such reduction in the energy of the oscillations is desirable in order to avoid the potential damage and destruction associated with a destructive resonant condition.

In an embodiment, the controller 136 of the control system 100 is configured to determine a periodic driving force exerted on the vehicle system 102 for a given segment of the route, and analyze the periodic driving force with an identified characteristic frequency associated with the vehicle system 102 to determine an excitation rate for the vehicle system 102. The excitation rate represents a rate or extent that energy attributable to the periodic driving force from the track 104 is absorbed by the vehicle system 102 and contributes to oscillations of the vehicle system 102 at the characteristic frequency. The excitation rate represents a level of how complementary the periodic driving force is to the characteristic frequency at which the vehicle system 102 oscillates. A high excitation rate may represent that the periodic driving force is highly complementary with the characteristic frequency of the vehicle system 102. A high excitation rate may lead to an undesirable destructive resonant condition after a period of time if unchecked. The speed of the vehicle system 102 affects the timing of the periodic driving force, and, therefore, the excitation rate. Thus, in an embodiment, the controller 136 may select or alter the speed of the vehicle system 102 through an undulating portion of the route in order to reduce the excitation rate below a level that risks a destructive resonant condition.

In an embodiment, the controller 136 determines the periodic driving force using the track geometry and the speed of the vehicle system 102. For example, the track geometry is used to identify and characterize an undulating portion of the segment of the route. The controller 136 accesses and uses the route curve profile monitored by the route geometry sensor 128. For example, using the route curve profile for a segment of the route, the controller 136 may identify a series of curves (attributable to hills, depressions, bumps, or the like) along the track 104 as an undulating portion of the segment. The controller 136 may be configured to measure a distance between curves along the undulating portion of the segment using the route curve profile. Since the undulating portion has a series of curves and may resemble a waveform, the distance between curves may be similar to a wavelength. The controller 136 receives a speed parameter from the speed sensor 116 to determine the speed or speeds at which the vehicle system 102 traverses the undulating portion of the segment. The controller 136 then calculates a frequency for the periodic driving force based on the wavelength and a speed at which the vehicle system 102 traverses the segment of the route.

The route curve profile provides characteristics about the geometry of the undulating portion of the segment of the route shown in FIG. 2. For example, the route curve profile identifies the lengths and locations of the uphill sections 208 and the downhill sections 210, as well as locations of apexes 212 and nadirs 214 (which are the low areas between and on either side of the hills). The route curve profile also includes information on the degree of curvature of curves, the elevation, and the like, along the undulating portion of the segment. By using the locations of apexes 212 and/or nadirs 214, for example, the controller 136 measures a distance between such apexes 212 and/or nadirs 214 to determine a wavelength 216 of the undulating portion. As shown in FIG. 2, the wavelengths 216 are shown between the nadirs 214. If the curves are due to hills in the topography, the wavelengths 216 may be on the order of kilometers or miles. If however, the curves are due to depressions or bumps in the track 104, the wavelengths 216 may be much shorter, such as on the order of tens or hundreds of meters or feet. The actual distance between each curve in the series of curves may not be identical, especially if the curves are due to hills or other topography of the route. The controller 136 may be configured to measure a different wavelength for each curve and/or may be configured to average the measured distances between multiple curves to determine an average wavelength.

The controller 136 is configured to receive speed parameters from the speed sensor 116 that indicate the current speeds of the vehicle system 102 along the segment of the route. The controller 136 may use the speed of the vehicle system 102 with the wavelength 216 to determine a frequency of the periodic driving force. For example, the controller 136 may compute the frequency using the equation $f=v/\lambda$, or a similar equation, in which "f" represents the frequency, "v" represents the speed of the vehicle system 102, and "$\lambda$" represents the wavelength. Thus, for a speed of 40 km/hr and a wavelength of 1 km, the frequency is calculated as 0.01111 Hz. This frequency represents that the vehicle system 102 takes 90 seconds to traverse the distance of each wavelength. In addition, the base of each uphill section 208 exerts a periodic driving force on the vehicle system 102 (to change the trajectory of the vehicle system 102) every 90 seconds.

Once the frequency of the periodic driving force is determined, the controller 136 analyzes the periodic driving force with the characteristic frequency associated with the vehicle system 102 to determine an excitation rate for the vehicle system 102. The controller 136 first identifies the characteristic frequency associated with the vehicle system 102. As described above, the characteristic frequency may be a resonant frequency associated with a type of one or more of the vehicles in the vehicle system 102. The controller 136 accesses the vehicle characterization element to receive information about the vehicle system 102. The vehicle characterization element may include information about the types of vehicles, number of different types of vehicles, and arrangement of the vehicles in the vehicle system 102. For example, in a rail context, the vehicle system 102 may be a unit train that includes a plurality, such as 50 or 100, railcars 110, and only a few propulsion vehicles 108 (or locomotives) that propel the railcars 110. Due to the large discrepancy in numbers and the arrangement of the vehicles, the oscillations of the railcars 110 may have a tendency to be more severe and cause more damage than any oscillations of the propulsion vehicles 108. Thus, the controller 136 of the control system 100 identifies the characteristic frequency of the vehicle system 102 as the resonant frequency of the railcars 110. Since different vehicles have different resonant frequencies, the controller 136 may be configured to identify the characteristic frequency as the resonant frequency of the type of vehicle that has the greatest susceptibility to achieve a destructive resonant condition and/or cause damage.

In an embodiment, the controller 136 may access a look-up table in the controller memory 140 to identify the characteristic frequency associated with the vehicle system 102. For example, the look-up table may include a list of multiple types of vehicles with corresponding characteristic frequencies associated with each of the types of vehicles. The list may organize the types of vehicles by manufacturer, product name or number, size, components parts, or the like. Once the controller 136 selects and identifies the type of vehicle to control the oscillations of, such as the cars 110 of the vehicle system 10, using the vehicle characterization element 134, the controller 136 may then consult the look-up table to identify the relevant characteristic frequency associated with that type of vehicle. The characteristic frequencies in the look-up table optionally may be resonant frequencies of different types of vehicles. In alternative embodiments, the look-up table may be stored in the vehicle characterization element 134 instead of the controller memory 140, or the information characterizing the vehicle system may be stored in the controller memory 140 instead of a separate vehicle characterization element 134.

The controller 136 determines the excitation rate by analyzing the periodic driving force with the identified characteristic frequency. The controller 136 compares the frequency of the periodic driving force (as in, the number of driving forces or impulses per a given time) to the characteristic frequency to determine how the periodic driving force complements the characteristic frequency. A higher excitation rate represents a greater level of compatibility between the periodic driving force and the characteristic frequency, such that a more energy is absorbed from the driving forces, as opposed to a lower excitation rate. Optionally, the controller 136 may analyze a waveform of the oscillations of the vehicle system at the characteristic frequency with a waveform of the periodic driving force to determine how the timing and magnitude of the periodic driving force affects the amplitude of the oscillations of the vehicle system 102. The periodic driving force and the oscillations of the vehicle system 102 may be represented as sinusoidal waveforms. The controller 136 may superpose or combine the waveforms by adding together the energy or amplitude of the individual waveforms to generate a combined waveform. By generating the combined waveform, the controller 136 determines whether the periodic driving force constructively interferes with or destructively interferes with the oscillations of the vehicle system 102. Constructive interference increases the amplitude of the oscillations, which could lead to a destructive resonant condition. Destructive interference decreases or dampens the amplitude of the oscillations. The controller 136 may also analyze the phase difference between the two frequencies. Phase differences at or around $2\pi$ radians (e.g., 360°) or multiples thereof produce constructive interference, while phase differences at or around $7\pi$ radians (e.g., 180°) or multiples thereof result in destructive interference.

The controller 136 may quantify the level or extent that the periodic driving force complements the characteristic frequency as an excitation rate or value. As described above, the excitation rate represents a rate or extent that energy attributable to the periodic driving force from the track 104 is absorbed by the vehicle system 102 and contributes to oscillations of the vehicle system 102 at the characteristic frequency. For example, the controller 136 may measure an amplitude of the combined waveform (generated by adding the amplitudes of the individual waveforms described above) to determine the excitation rate. Constructive interference yields a combined waveform that has a greater amplitude, as compared to destructive interference. The controller 136 may base the excitation rate on the amplitude of the combined waveform, such that a greater amplitude results in a greater excitation rate. Therefore, the excitation rate in a constructive interference situation is greater than the excitation rate in a destructive interference situation.

In an embodiment, the controller 136 may compare the determined excitation rate to a designated threshold. The designated threshold may be selected as a value that is below a known excitation rate that produces a destructive resonant condition. The destructive resonant condition occurs when the energy absorbed by the vehicle system 102, attributable to the periodic driving force, increases an amplitude of oscillations of the vehicle system 102 at the characteristic frequency over time. The amplitude and severity of the oscillations may continue to increase due to the impulses from the periodic driving force, eventually damaging or tipping over the vehicle system 102. The amplitude of the oscillations may be reduced by cessation of the periodic driving force or changing the frequency of the driving force to a frequency that is non-complementary with the characteristic frequency. Thus, an excitation rate above the designated threshold indicates that the vehicle system 102 may experience a destructive resonant condition as the vehicle system 102 traverses the segment of the route, so such an excitation rate is to be avoided. An excitation rate below the designated threshold indicates a permissible resonant condition of the vehicle system 102, such that the vehicle system 102 will not (or at least is unlikely to) experience a destructive resonant condition along the segment of the route at the specified operating parameters or settings.

Since the track geometry is a constant for a given segment of the route, the speed of the vehicle system 102 is the primary variable that affects the timing or frequency of the periodic driving force on the vehicle system 102. An increased speed of the vehicle system 102 increases the frequency of the periodic driving force. The characteristic frequency associated with the vehicle system 102 is also a constant. Therefore, since the excitation rate is determined by analyzing the characteristic frequency and the periodic driving force, the speed is also the primary variable that affects the excitation rate. Thus, due to the interactions between the periodic driving force and the characteristic frequency, the vehicle system 102 traversing an undulating portion of the route at one speed may have an excitation rate above the designated threshold, which could lead to an undesirable destructive resonant condition. On the other hand, if the vehicle system 102 traverses the same undulating portion of the route at a second, different speed, the excitation rate may be below the designated threshold, indicating a permissible resonant condition of the vehicle system 102. Therefore, in an embodiment, the controller 136 is configured to control a speed or speeds of the vehicle system 102 along the segment of the route such that the excitation rate remains below the designated threshold, to avoid a destructive resonant condition.

In one embodiment, the controller 136 controls the speed of the vehicle system 102 to avoid a destructive resonant condition in real time as the vehicle system 102 travels along the route. For example, as the vehicle system 102 travels along a given segment of the route, the controller 136 receives and/or accesses the route curve profile associated with the segment of the route from the route geometry sensor 128 or from the track characterization memory 130. In addition, the speed sensor 116 provides the controller 136 with the current speed of the vehicle system 102. The controller 136 uses the speed and route curve profile to determine the periodic driving force, and then analyzes the periodic driving force with the identified characteristic frequency to determine the excitation rate. These calculations may occur as the vehicle system 102 is traveling on the segment of the route. In an embodiment, if the excitation rate for the current speed of the vehicle system 102 exceeds the designated threshold, the controller 136 is configured to designate one or more tractive efforts and/or one or more braking efforts for the vehicle system 102 to change the speed of the vehicle system 102 such that an excitation rate at the new speed is below the threshold.

The tractive efforts and/or braking efforts may be designated in a mitigation plan that is generated by the controller 136. The mitigation plan may be an update to an existing trip plan that the vehicle system 102 had been following during the trip. The controller 136 may issue tractive settings to a propulsion subsystem or braking settings to a braking subsystem of the vehicle system 102 to achieve the desired speed change. For example, the controller 136 may generate a control signal that specifies tractive settings and/or braking settings according to the mitigation plan for the corresponding propulsion subsystem and/or braking subsystem to implement as the vehicle system traverses the segment of the route. Optionally, the settings contained in the control signal may be automatically implemented by the receiving propulsion and/or braking subsystems. Alternatively, the control signal may be communicated to a user interface device, which displays the settings according to the mitigation plan to an operator for manual implementation of the settings by the operator. The settings displayed to the operator may include a designated throttle position and/or brake position of a throttle and/or brake control device, a designated new speed, or the like.

The mitigation plan may designate other control settings in addition to, or instead of, tractive and braking settings. For example, the mitigation plan may include alerts that are communicated to the operator and/or to an off-board location. The alerts may be configured to notify the recipient when the determined excitation rate exceeds the designated threshold. A control signal including an alert may be communicated to the user interface device, for example, for aural and/or visual notification of the operator.

Thus, as the vehicle system 102 traverses a route on a trip, the control system 100 may monitor the track geometry and the speed of the vehicle system 102 in light of the characteristic frequency to determine if the speed of the vehicle system 102 has a risk or potential for leading to a destructive resonant condition. If the control system 100 determines the existence of a potential destructive resonant condition at the current operational settings, the control system 100 generates a mitigation plan to change the speed of the vehicle system 102 to reduce the potential for the destructive resonant condition.

In another embodiment, the controller 136 controls the speed of the vehicle system 102 to avoid a destructive resonant condition prior to a trip of the vehicle system 102 by identifying acceptable speeds at which the vehicle system 102 should traverse each segment of the route. For example, the track characterization memory 130 may store multiple route curve profiles for different segments of a route, where each route curve profile corresponds to a different segment. Alternatively, the route curve profiles may be stored in the controller memory 140. The route curve profiles may be measured and/or generated during previous trips of the vehicle system 102. The route curve profiles also may be received from other vehicle systems.

Using the route curve profile, the controller 136 may determine multiple prospective periodic driving forces for each segment of the route for a range of prospective speeds at which the vehicle system 102 may traverse the respective segment of the route. After identifying the characteristic frequency associated with the vehicle system 102, the controller 136 may analyze the prospective periodic driving forces with the characteristic frequency to determine multiple excitation rates of the vehicle system 102. Each of the excitation rates corresponds to a different speed in the range of prospective speeds. The controller 136 may compare the multiple excitation rates to each other and/or to a designated threshold to identify a subset of acceptable speeds within the range of prospective speeds. The acceptable speeds are each associated with an excitation rate that is below the designated threshold and/or below other excitation rates corresponding to other speeds. The acceptable speeds are speeds at which the vehicle system 102 may traverse the corresponding segment of the route without risking a destructive resonant condition of the vehicle system 102.

The subset of acceptable speeds may be a range of speeds. For example, for a given segment of the route and a range of prospective speeds from 0-60 mph, the acceptable speeds may be 0-42 mph and 46-60 mph. Thus, during the trip, the vehicle system 102 may be controlled to travel along that segment at any speed other than 43, 44, or 45 mph. The controller 136 may store the acceptable speeds in a memory, such as the controller memory 140. The controller 136 may store acceptable speeds for each of the multiple segments of the route, creating a database. The acceptable speeds may be used by the controller 136 when generating a trip plan for an upcoming trip of the vehicle system 102. For example, the trip plan may designate at least one of tractive or braking efforts for implementation by the vehicle system 102 such that the vehicle system 102 achieves one or more of the acceptable speeds as the vehicle system 102 traverses the segment of the route. When generating the trip plan, the controller 136 may consider un-acceptable speeds (for example, the speeds that are not acceptable speeds) as constraints or limitations that are to be avoided as the vehicle system 102 travels along the corresponding segment of the route.

In the example above, the acceptable speeds are specific to the vehicle system 102, since the determination relies on the characteristic frequency of the vehicle system 102. Thus, the database in the controller memory 140 includes ranges of acceptable speeds along corresponding segments of the route for the specific vehicle system 102. In an embodiment, the control system 100 may be configured to create or contribute to a database that is not limited to one specific vehicle system. For example, the controller 136 may make the same calculations using different characteristic frequencies to determine ranges of acceptable speeds along segments of a route for different vehicle systems. The controller 136 may access a look-up table to identify some common characteristic frequencies associated with different known types of vehicle. Once the calculations are performed for various characteristic frequencies and the acceptable speeds are stored in the database, the control system 100 for future trips may be able to look up pre-determined acceptable speeds for the specific vehicle system using the database. For example, the control system 100 may only need to identify the segments of the route to be traversed during the trip and the make-up of the vehicle system in order to identify the corresponding acceptable speeds for the vehicle system on the upcoming trip.

Optionally, the control system 100 may also mitigate the risk of destructive resonant conditions along segments of the route by identifying undulating portions of the route that may require maintenance. For example, the monitored route curve profile may indicate undulating portions that include periodic depressions in the track due to settling of the rails. The portions of the route that include depressions may be amenable to maintenance to raise the depressed areas, for example. The control system 100 may notify appropriate maintenance departments of the identified areas of the route that may require maintenance. Upon raising the depressions, the undulations in the route are reduced, which alters the periodic driving forces exerted on the vehicle system by the depressions and mitigates the risk of oscillations at a destructive resonant condition.

Figure 3:
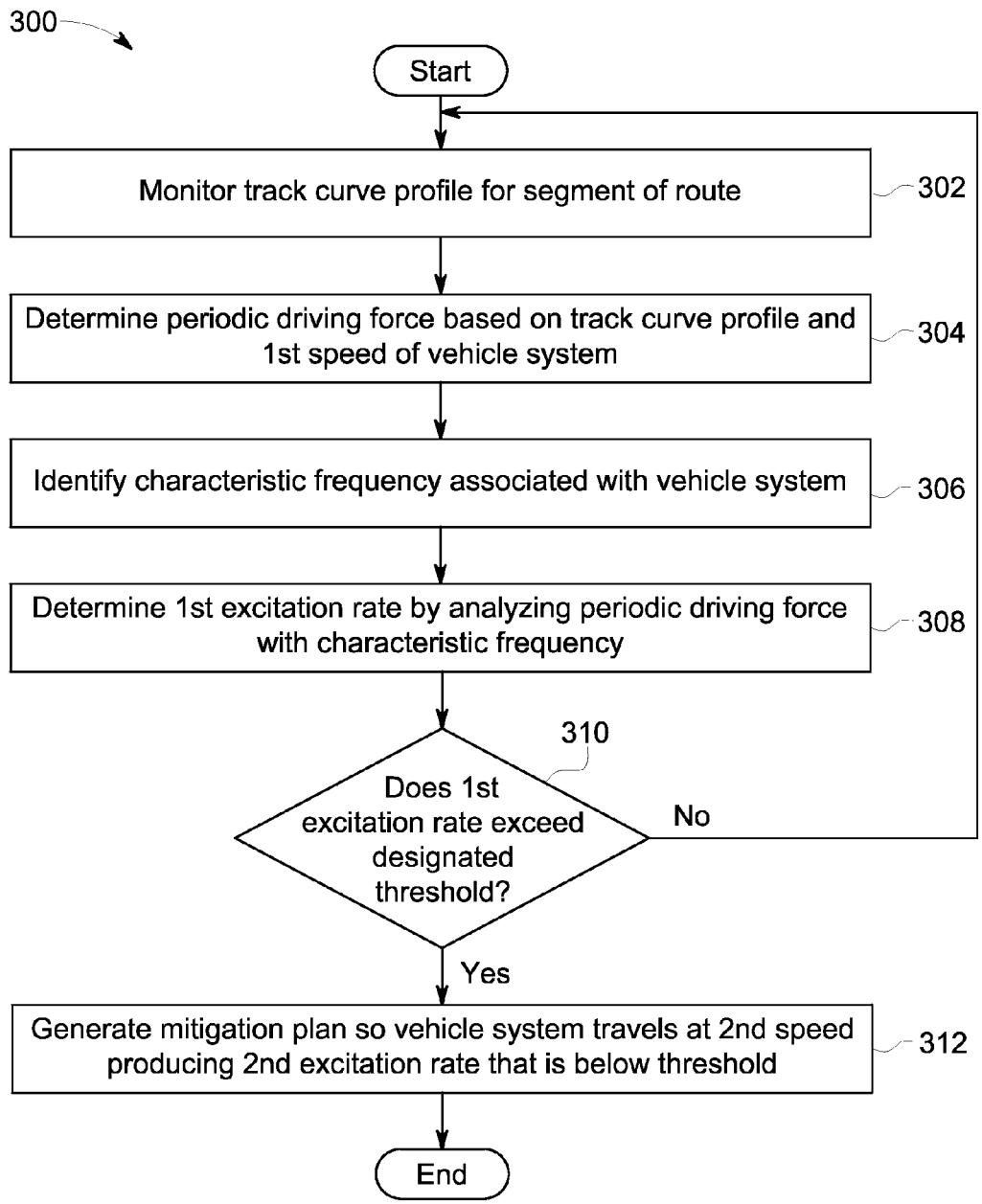
FIG. 3 is a flow chart of one embodiment of a method for controlling a vehicle system that travels on a route.

FIG. 3 is a flow chart of one embodiment of a method 300 for controlling a vehicle system that travels on a track along a route. At 302, a route curve profile for a segment of the route is monitored. The route curve profile describes at least one of elevation, vertical curvature, horizontal curvature, and cant (or super-elevation) of the track as a function of location along the segment. The route curve profile may be monitored by the vehicle system as the vehicle system traverses the segment of the route. The route curve profile may be monitored during a current trip of the vehicle system or during a prior trip of the vehicle system over the route.

At 304, a periodic driving force for the segment of the route is determined based on the route curve profile and a first speed of the vehicle system. The first speed is the speed at which the vehicle system traverses the segment of the route. The periodic driving force includes a series of forces attributable to undulations in the track that are exerted on the vehicle system over time. The periodic driving force may be determined be measuring a wavelength for an undulating portion of the track using the route curve profile. A frequency of the periodic driving force may be calculated based on the first speed of the vehicle system and the measured wavelength.

At 306, a characteristic frequency associated with the vehicle system is identified. The characteristic frequency may be a resonant frequency of one or more of the vehicles in the vehicle system. The characteristic frequency may be identified by consulting a look-up table based on a make-up of the vehicle system, including the type of the vehicles, as identified by manufacturer, product number, size, materials, component parts (for example, type of suspension system), or the like. At 308, a first excitation rate for the vehicle system along the segment of the route is determined by analyzing the periodic driving force at the first speed of the vehicle system with the characteristic frequency. The excitation rate may be a rate or extent that energy attributable to the periodic driving force from the track is absorbed by the vehicle system and contributes to oscillations of the vehicle system at the characteristic frequency.

At 310, a determination is made whether the first excitation rate exceeds a designated threshold. If the first excitation rate does not exceed the designated threshold, flow of the method returns to step 302, and the route curve profile is monitored. If the first excitation rate exceeds the designated threshold, flow of the method proceeds to step 312. At 312, one or more tractive efforts and/or one or more braking efforts are designated in a mitigation plan in order for the vehicle system to travel at a second speed that produces a second excitation rate that is below the designated threshold. The tractive efforts and/or braking efforts are designated for implementation by the vehicle system in order to change the speed of the vehicle system such that the vehicle system traverses the segment at the different, second speed, which produces the second excitation rate that is below the designated threshold. The mitigation plan may be generated by a controller of the vehicle system.

Optionally, the method 300 may further include communicating a control signal to at least one of a propulsion subsystem or a braking subsystem on the vehicle system. The control signal specifies at least one of tractive settings or braking settings according to the mitigation plan for the corresponding propulsion subsystem or braking subsystem to automatically implement as the vehicle system traverses the segment of the route in order to achieve the second speed. Alternatively, or in addition, the method 300 may include communicating a control signal to a user interface device on the vehicle system. The control signal specifies at least one of tractive settings or braking settings according to the mitigation plan for the user interface device to display to an operator of the vehicle system for manual implementation by the operator.

In an embodiment, a control system includes a route geometry sensor, a speed sensor, and a controller. The route geometry sensor is configured to monitor a route curve profile for a segment of a route as a vehicle system traverses the segment of the route. The speed sensor is configured to monitor a speed of the vehicle system traversing the segment of the route. The controller includes one or more processors. The controller is configured to identify a characteristic frequency associated with the vehicle system. The controller is configured to receive the route curve profile from the route geometry sensor and a speed parameter associated with the speed from the speed sensor. The controller is further configured to determine a periodic driving force exerted on the vehicle system from the route along the segment of the route based on the route curve profile and the speed parameter. The controller is configured to analyze the periodic driving force with the characteristic frequency to determine an excitation rate for the vehicle system. Responsive to the excitation rate exceeding a designated threshold, the controller is configured to designate at least one of one or more tractive efforts or one or more braking efforts for implementation by the vehicle system to change the speed at which the vehicle system travels along the segment of the route such that the excitation rate falls below the threshold.

In an aspect, the controller is configured to identify the characteristic frequency of the vehicle system by identifying a vehicle type of at least one vehicle in the vehicle system and consulting a look-up table stored in a memory of the control system. The look-up table lists multiple different types of vehicles with corresponding characteristic frequencies associated with each of the different types of vehicles.

In another aspect, the route geometry sensor includes at least one of an accelerometer, a gyroscope, an angular position sensor, or an inertial navigation reference device.

In another aspect, the route curve profile describes a three-dimensional geometry of the route including at least one of elevation, vertical curvature, horizontal curvature, and cant of the route as a function of location along the segment of the route.

In another aspect, the controller is configured to generate a mitigation plan that designates the at least one of the one or more tractive efforts or the one or more braking efforts of the vehicle system to change the speed at which the vehicle system travels along the segment of the route such that the excitation rate falls below the threshold, and the controller is further configured to generate a control signal for communication to at least one of a propulsion subsystem or a braking subsystem of the vehicle system. The control signal specifies at least one of tractive settings or braking settings according to the mitigation plan for automatic implementation by the corresponding propulsion subsystem or braking subsystem as the vehicle system traverses the segment of the route in order to achieve the change in the speed.

In another aspect, the vehicle system includes plural interconnected non-propulsion vehicles that have a common type of suspension system. The controller being configured to identify the characteristic frequency associated with the vehicle system at least in part by determining a resonant frequency of the type of suspension system in the non-propulsion vehicles.

In another aspect, the controller is configured to determine the periodic driving force for the segment of the route by measuring a wavelength for an undulating portion of the route using the route curve profile and calculating a frequency based on the speed of the vehicle system and the measured wavelength.

In another aspect, the excitation rate represents a rate or extent that energy attributable to the periodic driving force from the route is absorbed by the vehicle system and contributes to oscillations of the vehicle system at the characteristic frequency.

In another aspect, the controller is configured to analyze the periodic driving force with the characteristic frequency by superposing a waveform representative of the periodic driving force with a waveform representative of oscillations of the vehicle system at the characteristic frequency to generate a combined waveform. The controller configured to measure an amplitude of the combined waveform to determine the excitation rate for the vehicle system.

In another aspect, an excitation rate above the designated threshold indicates a destructive resonant condition of the vehicle system. The destructive resonant condition occurs when the energy absorbed by the vehicle system attributable to the periodic driving force increases an amplitude of oscillations of the vehicle system at the characteristic frequency over time. An excitation rate below the designated threshold indicates a permissible resonant condition of the vehicle system.

In another embodiment, a method for controlling a vehicle system that travels along a route includes identifying a characteristic frequency associated with the vehicle system. The method includes monitoring a route curve profile for a segment of the route. The method also includes determining a periodic driving force for the segment of the route. The periodic driving force includes a series of forces attributable to undulations in the route that are exerted on the vehicle system over time. The periodic driving force is determined based on the route curve profile and a first speed at which the vehicle system traverses the segment of the route. The method further includes determining a first excitation rate for the vehicle system along the segment of the route at the first speed by analyzing the periodic driving force with the characteristic frequency. Responsive to the first excitation rate exceeding a designated threshold, the method includes designating at least one of one or more tractive efforts or one or more braking efforts for implementation by the vehicle system such that the vehicle system traverses the segment at a different, second speed. The second speed produces a second excitation rate that is below the threshold.

In an aspect, the route curve profile describes at least one of elevation, vertical curvature, horizontal curvature, and cant of the route as a function of location along the segment. The periodic driving force is determined by measuring a wavelength for an undulating portion of the route using the route curve profile and calculating a frequency based on the first speed of the vehicle system and the measured wavelength.

In another aspect, the excitation rate is a rate or extent that energy attributable to the periodic driving force from the route is absorbed by the vehicle system and contributes to oscillations of the vehicle system at the characteristic frequency.

In another aspect, the method further includes generating a mitigation plan that designates the at least one of the one or more tractive efforts or the one or more braking efforts, and communicating a control signal to at least one of a propulsion subsystem or a braking subsystem on the vehicle system. The control signal specifies at least one of tractive settings or braking settings according to the mitigation plan for the corresponding propulsion subsystem or braking subsystem to automatically implement as the vehicle system traverses the segment of the route in order to achieve the second speed.

In another aspect, the method further includes generating a mitigation plan that designates the at least one of the one or more tractive efforts or the one or more braking efforts, and communicating a control signal to a user interface device on the vehicle system. The control signal specifies at least one of tractive settings or braking settings according to the mitigation plan for the user interface device to display to an operator of the vehicle system for manual implementation of the at least one of tractive settings or braking settings by the operator.

In another embodiment, a control system includes a memory and a controller. The memory stores a route curve profile for a segment of a route along which a vehicle system is configured to travel. The controller includes one or more processors. The controller is communicatively coupled to the memory. The controller is configured to identify a characteristic frequency associated with the vehicle system. The controller is further configured to access the route curve profile from the memory and use both the route curve profile and the characteristic frequency to determine multiple excitation rates for the vehicle system for a range of prospective speeds at which the vehicle system traverses the segment of the route. Each of the excitation rates corresponds to a different speed in the range of prospective speeds. The controller is configured to compare the multiple excitation rates to a designated threshold and identify a subset of acceptable speeds within the range of prospective speeds. The acceptable speeds are each associated with an excitation rate that is below the designated threshold. The acceptable speeds represent speeds for the vehicle system to traverse the segment of the route without producing a destructive resonant condition of the vehicle system.

In an aspect, the vehicle system includes plural interconnected non-propulsion vehicles that have a common type of suspension system. The controller is configured to identify the characteristic frequency associated with the vehicle system by determining a resonant frequency of the type of suspension system in the non-propulsion vehicles.

In another aspect, the controller is configured to determine each of the multiple excitation rates by analyzing the characteristic frequency with a prospective periodic driving force. Each prospective periodic driving force is specific to one of the prospective speeds in the range. The controller is configured to determine each prospective periodic driving force by measuring a wavelength for an undulating portion of the route using the route curve profile and calculating a frequency based on the corresponding speed of the vehicle system and the measured wavelength.

In another aspect, the route curve profile describes a three-dimensional geometry of the route including at least one of elevation, vertical curvature, horizontal curvature, and cant of the route as a function of location along the segment.

In another aspect, the controller is further configured to designate at least one of one or more tractive efforts or one or more braking efforts for implementation by the vehicle system such that the vehicle system achieves one or more of the acceptable speeds as the vehicle system traverses the segment of the route.

In another embodiment, a control system (e.g., a control system for controlling a vehicle system) includes a route geometry sensor, a speed sensor, and a controller. The route geometry sensor is configured to monitor a route curve profile for a segment of a route as the vehicle system traverses the segment of the route. The speed sensor is configured to monitor a speed of the vehicle system traversing the segment of the route. The controller includes one or more processors, and is configured to determine a periodic driving force exerted on the vehicle system from the route along the segment of the route based on the route curve profile and information of the speed. The controller is further configured to determine an excitation rate for the vehicle system based on the periodic driving force and a characteristic frequency associated with the vehicle system. Responsive to the excitation rate exceeding a designated threshold, the controller is configured to designate at least one of one or more tractive efforts or one or more braking efforts for implementation by the vehicle system to change the speed at which the vehicle system travels along the segment of the route such that the excitation rate falls below the threshold.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described herein without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A control system comprising:
a route geometry sensor configured to monitor a route curve profile for a segment of a route as a vehicle system traverses the segment of the route;
a speed sensor configured to monitor a speed of the vehicle system traversing the segment of the route; and
a controller including one or more processors, the controller configured to identify a characteristic frequency associated with the vehicle system, the controller configured to receive the route curve profile from the route geometry sensor and a speed parameter associated with the speed from the speed sensor, the controller further configured to determine a periodic driving force exerted on the vehicle system from the route along the segment of the route based on the route curve profile and the speed parameter, the controller being configured to analyze the periodic driving force with the characteristic frequency to determine an excitation rate for the vehicle system;

wherein, responsive to the excitation rate exceeding a designated threshold, the controller is configured to designate at least one of one or more tractive efforts or one or more braking efforts for implementation by the vehicle system to change the speed at which the vehicle system travels along the segment of the route such that the excitation rate falls below the threshold.

2. The control system of claim 1, wherein the controller is configured to identify the characteristic frequency of the vehicle system by identifying a vehicle type of at least one vehicle in the vehicle system and consulting a look-up table stored in a memory of the control system, the look-up table listing multiple different types of vehicles with corresponding characteristic frequencies associated with each of the different types of vehicles.

3. The control system of claim 1, wherein the route geometry sensor includes at least one of an accelerometer, a gyroscope, an angular position sensor, or an inertial navigation reference device.

4. The control system of claim 1, wherein the route curve profile describes a three-dimensional geometry of the route including at least one of elevation, vertical curvature, horizontal curvature, and cant of the route as a function of location along the segment of the route.

5. The control system of claim 1, wherein the controller is configured to generate a mitigation plan that designates the at least one of the one or more tractive efforts or the one or more braking efforts of the vehicle system to change the speed at which the vehicle system travels along the segment of the route such that the excitation rate falls below the threshold, and the controller is further configured to generate a control signal for communication to at least one of a propulsion subsystem or a braking subsystem of the vehicle system, the control signal specifying at least one of tractive settings or braking settings according to the mitigation plan for automatic implementation by the corresponding propulsion subsystem or braking subsystem as the vehicle system traverses the segment of the route in order to achieve the change in the speed.

6. The control system of claim 1, wherein the vehicle system includes plural interconnected non-propulsion vehicles that have a common type of suspension system, the controller being configured to identify the characteristic frequency associated with the vehicle system at least in part by determining a resonant frequency of the type of suspension system in the non-propulsion vehicles.

7. The control system of claim 1, wherein the controller is configured to determine the periodic driving force for the segment of the route by measuring a wavelength for an undulating portion of the route using the route curve profile and calculating a frequency based on the speed of the vehicle system and the measured wavelength.

8. The control system of claim 1, wherein the excitation rate represents a rate or extent that energy attributable to the periodic driving force from the route is absorbed by the vehicle system and contributes to oscillations of the vehicle system at the characteristic frequency.

9. The control system of claim 1, wherein the controller is configured to analyze the periodic driving force with the characteristic frequency by superposing a waveform representative of the periodic driving force with a waveform representative of oscillations of the vehicle system at the characteristic frequency to generate a combined waveform, the controller being configured to measure an amplitude of the combined waveform to determine the excitation rate for the vehicle system.

10. The control system of claim 1, wherein an excitation rate above the designated threshold indicates a destructive resonant condition of the vehicle system, the destructive resonant condition occurring when the energy absorbed by the vehicle system attributable to the periodic driving force increases an amplitude of oscillations of the vehicle system at the characteristic frequency over time, and an excitation rate below the designated threshold indicates a permissible resonant condition of the vehicle system.

11. A method for controlling a vehicle system that travels along a route, the method comprising:

identifying a characteristic frequency associated with the vehicle system;

monitoring a route curve profile for a segment of the route;

determining a periodic driving force for the segment of the route, the periodic driving force including a series of forces attributable to undulations in the route that are exerted on the vehicle system over time, the periodic driving force being determined based on the route curve profile and a first speed at which the vehicle system traverses the segment of the route;

determining a first excitation rate for the vehicle system along the segment of the route at the first speed by analyzing the periodic driving force with the characteristic frequency; and responsive to the first excitation rate exceeding a designated threshold, designating at least one of one or more tractive efforts or one or more braking efforts for implementation by the vehicle system such that the vehicle system traverses the segment at a different, second speed, the second speed producing a second excitation rate that is below the threshold.

12. The method of claim 11, wherein the route curve profile describes at least one of elevation, vertical curvature, horizontal curvature, and cant of the route as a function of location along the segment, the periodic driving force being determined by measuring a wavelength for an undulating portion of the route using the route curve profile and calculating a frequency based on the first speed of the vehicle system and the measured wavelength.

13. The method of claim 11, wherein the excitation rate is a rate or extent that energy attributable to the periodic driving force from the route is absorbed by the vehicle system and contributes to oscillations of the vehicle system at the characteristic frequency.

14. The method of claim 11, further comprising generating a mitigation plan that designates the at least one of the one or more tractive efforts or the one or more braking efforts, and communicating a control signal to at least one of a propulsion subsystem or a braking subsystem on the vehicle system, the control signal specifying at least one of tractive settings or braking settings according to the mitigation plan for the corresponding propulsion subsystem or braking subsystem to automatically implement as the vehicle system traverses the segment of the route in order to achieve the second speed.

15. The method of claim 11, further comprising generating a mitigation plan that designates the at least one of the one or more tractive efforts or the one or more braking efforts, and communicating a control signal to a user interface device on the vehicle system, the control signal specifying at least one of tractive settings or braking settings according to the mitigation plan for the user interface device to display to an operator of the vehicle system for manual implementation of the at least one of tractive settings or braking settings by the operator.

16. A control system comprising:
   a memory that stores a route curve profile for a segment of a route along which a vehicle system is configured to travel; and
   a controller including one or more processors, the controller communicatively coupled to the memory, the controller configured to identify a characteristic frequency associated with the vehicle system, the controller further configured to access the route curve profile from the memory and use both the route curve profile and the characteristic frequency to determine multiple excitation rates of the vehicle system for a range of prospective speeds at which the vehicle system traverses the segment of the route, each of the excitation rates corresponding to a different speed in the range of prospective speeds,
   wherein the controller is configured to compare the multiple excitation rates to a designated threshold and identify a subset of acceptable speeds within the range of prospective speeds, the acceptable speeds each associated with an excitation rate that is below the designated threshold, the acceptable speeds representing speeds for the vehicle system to traverse the segment of the route without producing a destructive resonant condition of the vehicle system.

17. The control system of claim 16, wherein the vehicle system includes plural interconnected non-propulsion vehicles that have a common type of suspension system, the controller being configured to identify the characteristic frequency associated with the vehicle system by determining a resonant frequency of the type of suspension system in the non-propulsion vehicles.

18. The control system of claim 16, wherein the controller is configured to determine each of the multiple excitation rates by analyzing the characteristic frequency with a prospective periodic driving force, each prospective periodic driving force being specific to one of the prospective speeds in the range, the controller being configured to determine each prospective periodic driving force by measuring a wavelength for an undulating portion of the route using the route curve profile and calculating a frequency based on the corresponding speed of the vehicle system and the measured wavelength.

19. The control system of claim 16, wherein the route curve profile describes a three-dimensional geometry of the route including at least one of elevation, vertical curvature, horizontal curvature, and cant of the route as a function of location along the segment of the route.

20. The control system of claim 16, wherein the controller is further configured to designate at least one of one or more tractive efforts or one or more braking efforts for implementation by the vehicle system such that the vehicle system achieves one or more of the acceptable speeds as the vehicle system traverses the segment of the route.

21. A control system comprising:
   a route geometry sensor configured to monitor a route curve profile for a segment of a route as a vehicle system traverses the segment of the route;
   a speed sensor configured to monitor a speed of the vehicle system traversing the segment of the route; and
   a controller including one or more processors, wherein the controller is configured to determine a periodic driving force exerted on the vehicle system from the route along the segment of the route based on the route curve profile and information of the speed, and to determine an excitation rate for the vehicle system based on the periodic driving force and a characteristic frequency associated with the vehicle system,
   wherein, responsive to the excitation rate exceeding a designated threshold, the controller is configured to designate at least one of one or more tractive efforts or one or more braking efforts for implementation by the vehicle system to change the speed at which the vehicle system travels along the segment of the route such that the excitation rate falls below the threshold.

* * * * *